(12) United States Patent
Orton

(10) Patent No.: US 11,026,533 B2
(45) Date of Patent: Jun. 8, 2021

(54) PACKAGE RECEPTACLE ASSEMBLY INTEGRATED INTO AN EXTERIOR FEATURE OF A HOME

(71) Applicant: Robert Orton, Clive, IA (US)

(72) Inventor: Robert Orton, Clive, IA (US)

( * ) Notice: Subject to any disclaimer, the term of this patent is extended or adjusted under 35 U.S.C. 154(b) by 25 days.

(21) Appl. No.: 16/556,774

(22) Filed: Aug. 30, 2019

(65) Prior Publication Data

US 2020/0146489 A1    May 14, 2020

Related U.S. Application Data

(60) Provisional application No. 62/760,191, filed on Nov. 13, 2018.

(51) Int. Cl.
| | | |
|---|---|---|
| *A47G 29/14* | (2006.01) | |
| *A47G 29/30* | (2006.01) | |
| *B65G 11/02* | (2006.01) | |
| *A47G 29/20* | (2006.01) | |
| *A47G 29/12* | (2006.01) | |
| *E04C 3/30* | (2006.01) | |

(52) U.S. Cl.
CPC ..... *A47G 29/141* (2013.01); *A47G 29/12095* (2017.08); *A47G 29/20* (2013.01); *A47G 29/30* (2013.01); *B65G 11/023* (2013.01); *A47G 2029/142* (2013.01); *A47G 2029/144* (2013.01); *A47G 2029/149* (2013.01); *E04C 3/30* (2013.01)

(58) Field of Classification Search
CPC ...... A47G 29/141; A47G 29/20; A47G 29/30; A47G 29/16; A47G 29/12095; A47G 29/1248; A47G 2029/142; A47G 2029/144; A47G 2029/148; A47G 2029/149; B65G 11/023; B65G 11/04; B65G 2201/0285; E04C 3/30; B64C 39/02; B64C 39/024; B64C 2201/128; B64F 1/32; B64D 1/02; B64D 1/12
USPC .......... 232/19, 43.1, 43.5, 44, 45, 47; 193/8; 52/173.1, 834; 340/569, 568.1, 5.73; 244/114 R, 118.1, 118.2, 137.1, 137.4
See application file for complete search history.

(56) References Cited

U.S. PATENT DOCUMENTS

| | | |
|---|---|---|
| 258,668 A | 5/1882 | Paine |
| 930,936 A | 8/1909 | Burris |
| 2,088,806 A | 8/1934 | Ottmann |
| 3,401,875 A | 9/1968 | Bruhns |
| 5,009,018 A | 4/1991 | Sebag |
| 5,096,115 A | 3/1992 | Hassan |

(Continued)

*Primary Examiner* — William L Miller
(74) *Attorney, Agent, or Firm* — Zarley Law Firm, P.L.C.

(57) ABSTRACT

The present invention relates to a package receptacle assembly that is integrated into a column of a home. The compartment in some embodiments has a door that is positioned in a front wall of the compartment so that the door is positioned between the rear wall of the compartment and a front door of a home, which obscures the door from view. The door in some arrangements has a locking assembly, which is configured to send out notification and provide remote control of the locking assembly in various iterations of the present invention. Some embodiments have a chute that extends through the column and between the compartment and the roof to allow delivery of a package onto the roof and through the column to the compartment, such as by way of a UAV. Other embodiments include a chute that extends from the compartment to the home.

20 Claims, 5 Drawing Sheets

(56) References Cited

U.S. PATENT DOCUMENTS

| | | | |
|---|---|---|---|
| 5,390,849 A | 2/1995 | Frissard | |
| 6,375,071 B1 | 4/2002 | Kim | |
| 6,967,575 B1 * | 11/2005 | Dohrmann | A47G 29/141 220/592.01 |
| 7,175,071 B1 | 2/2007 | Slagle et al. | |
| 7,191,573 B1 | 3/2007 | Newton, II | |
| 7,243,473 B2 * | 7/2007 | Terrels | E04F 11/1812 52/843 |
| 8,534,005 B2 | 9/2013 | Thomas et al. | |
| 10,351,261 B1 * | 7/2019 | Bryant | G07F 9/002 |
| 2009/0084836 A1 | 4/2009 | Dudley | |
| 2011/0030292 A1 | 2/2011 | Oram et al. | |
| 2011/0084123 A1 | 4/2011 | Cox et al. | |
| 2015/0158599 A1 * | 6/2015 | Sisko | E01F 3/00 244/114 R |
| 2016/0257423 A1 * | 9/2016 | Martin | B64F 1/00 |
| 2018/0352987 A1 * | 12/2018 | Kutas | A47G 29/1214 |
| 2019/0233135 A1 * | 8/2019 | Cantrell | B64F 1/32 |
| 2019/0300202 A1 * | 10/2019 | High | G05B 15/02 |
| 2020/0085222 A1 * | 3/2020 | Kutas | A47G 29/141 |
| 2020/0237132 A1 * | 7/2020 | Kaechele | A47G 29/22 |
| 2020/0237946 A1 * | 7/2020 | Shell | A47G 29/141 |
| 2020/0288895 A1 * | 9/2020 | Bennet | G06Q 50/28 |

\* cited by examiner

PACKAGE RECEPTACLE ASSEMBLY INTEGRATED INTO AN EXTERIOR FEATURE OF A HOME

CROSS REFERENCE TO RELATED APPLICATION

This application claims the benefit of priority from Provisional Application No. 62/760,191 filed Nov. 13, 2018, the contents of these applications are hereby incorporated by reference in their entirety.

BACKGROUND OF THE INVENTION

This invention is directed toward a package receptacle assembly. More specifically, and without limitation, this invention relates to a package receptacle assembly integrated into an exterior feature of a home.

Mailboxes are well known in the art. Mailboxes are used to receive letters, notices, and advertisements delivered to individuals at their residence or homes.

Mailboxes though suffer from a number of deficiencies that have been highlighted over the recent years due to the prevalence of online shopping, which requires the frequent delivery of packages. The size and shape of packages makes it difficult if not impossible to place the package within a mailbox. Oftentimes, the package is crammed in with other letters and items that cause damage to the package or everything contained in the mailbox.

Some individuals have mail slots integrated into the front door of their homes. However, these mail slots are significantly limited in what passes through them. For items that can pass through, the item must drop into the home, possibly causing damage. If the individual is gone for an extended period of time or there are a substantial number of mailings, the front door can become obstructed by the deliveries.

As a result, it is more common that packages are simply left on the front porch or stoop of an individual's home near their front door or garage. This is also problematic for a host of reasons as well.

Packages that are left near a home, including by the front door, are easily seen by others passing by, including thieves who can simply walk away with the package. In inclement weather, packages are exposed to the natural elements, which can be damaging to packages—especially cardboard boxes that significantly weaken after being wet. The location of deliveries is also unrestricted, which in turn can lead to an individual needing to search to determine where the package was left. With particular respect to unmanned aerial vehicles, it can be cumbersome to make a delivery between the column, roof, and porch of stoop.

Although attempts have been made to address some of these deficiencies in the art, the advancements are either simply inadequate, or present their own particular problems. One such approach is the transmission of delivery notifications and updates that allow an individual to track their package and obtain an estimated window of delivery. However, unless the individual intends to quickly return home or be in attendance during the wide-ranging delivery window, many of the above discussed problems are still present.

Other direct methods of monitoring are available, including the use of cameras attached above an individual's front door that monitors activity in that vicinity. Like the notifications, many of the same problems exist, even if the live stream of the camera is monitored. This includes the theft of packages as many cameras have low quality images and thieves can easily disguise their identity making later apprehension almost impossible.

A more dramatic approach to secure packages involve receiving the packages at a location remote from the home. For instance, lockers are now available that packages can be delivered to, stored in and then retrieved from. Another approach is retrieving them from a distribution center. Both of these require that the individual must go to the location to obtain their package, which requires travel, delays, and identification, among other inconveniences. These approaches also contradict the underlying reason the package is being sent, i.e., the recipient wanted to avoid travel.

Thus it is a primary objective of this invention to provide a package receptacle assembly that improves upon the art.

Another objective of this invention is to provide a package receptacle assembly that integrates into the exterior feature of a home.

Yet another objective of this invention is to provide a package receptacle assembly that secures one or more packages from natural weather conditions and potential theft.

Another objective of this invention is to provide a package receptacle assembly that maintains the aesthetic appeal of a home.

Yet another objective of this invention is to provide a package receptacle assembly that is difficult to identify.

Yet another objective of this invention is to provide a package receptacle assembly that secures packages inside a home.

Another objective of this invention is to provide a package receptacle assembly that receives packages from unmanned aerial vehicles.

These and other objectives, features, and advantages of the invention will become apparent from the specification and claims.

BRIEF SUMMARY OF THE INVENTION

In general, the present invention relates to a receptacle assembly that is integrated into a column of a home or domicile that typically extends between a ground surface or porch of the home to a roof of the home. The compartment is configured to receive one or more packages that would typically be delivered to the home and left out in the open.

The compartment has a door, which in some embodiments is positioned between the front door of the home and a rear wall of the compartment. In this way, the door is hidden from view as people walk by the home adding a unique advantage over the known methods of securing a delivered package.

To address the rise in UAV or drone deliveries, some embodiments of the present invention comprise a chute within the column that extends from and between the compartment and the roof of the home. A flap is present in some embodiments to prevent the natural elements, such as rain, from entering the chute. The presence of the chute allows UAVs to drop packages in through the chute and into the compartment.

Other embodiments of the present invention include a second chute that extends from the compartment to the home, including a basement of the home. The presence of this additional chute allows packages to be secured within the home. This is particularly advantageous when multiple packages are delivered, which absent delivery into the home, would occupy more space than is available within a cavity of the compartment. The second chute can also have a flap that allows the home owner to selectively open and close the flap leading either from the compartment or into the home.

Some arrangements of the present invention include a locking assembly that is configured to selectively engage and secure the door of the compartment. The locking assembly can take a variety of forms, including a key lock and key, a keypad, or a system that utilizes remote control to engage or disengage the locking assembly. In some arrangements, the locking assembly comprises an internal switch, which allows delivery personnel the ability to engage the locking assembly the next time the door is closed. In this way, the cavity of the compartment can be readily accessed up and until a package is delivered. Thereafter, the home owner can retrieve the package by unlocking the locking assembly, which will be disengaged until another package is delivered and the internal switch is toggled again.

In other iterations of the present invention, a video assembly is positioned within the compartment to capture and transmit visual information. The video assembly in some embodiments is configured to provide a livestream and recording of the visual information that is captured. Additionally, the video assembly in some arrangements is configured to capture information contained on the package, such as a package label or bar code.

DETAILED DESCRIPTION

Figure 1:
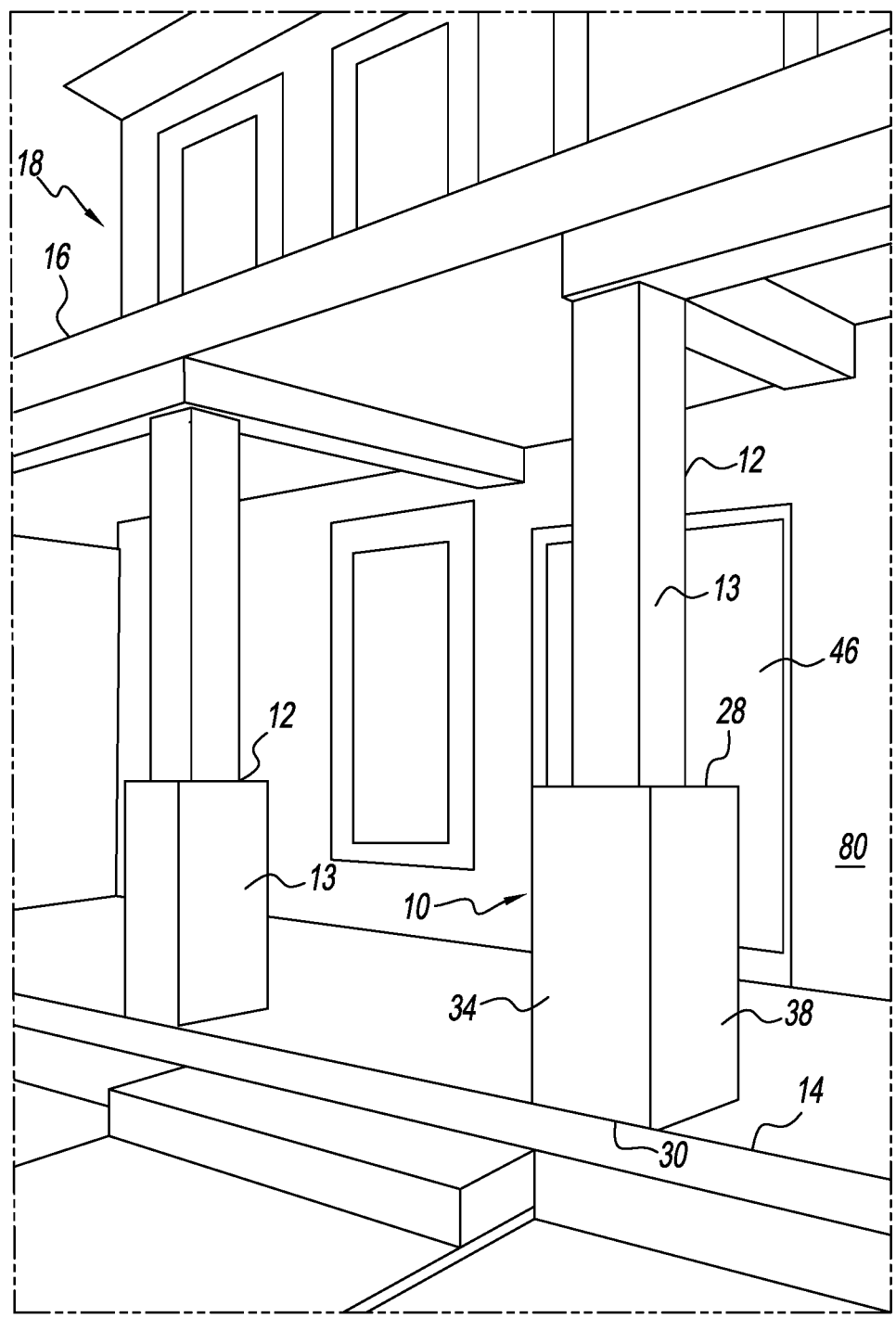
FIG. 1 is a perspective view of a package receptacle assembly.
Figure 2:
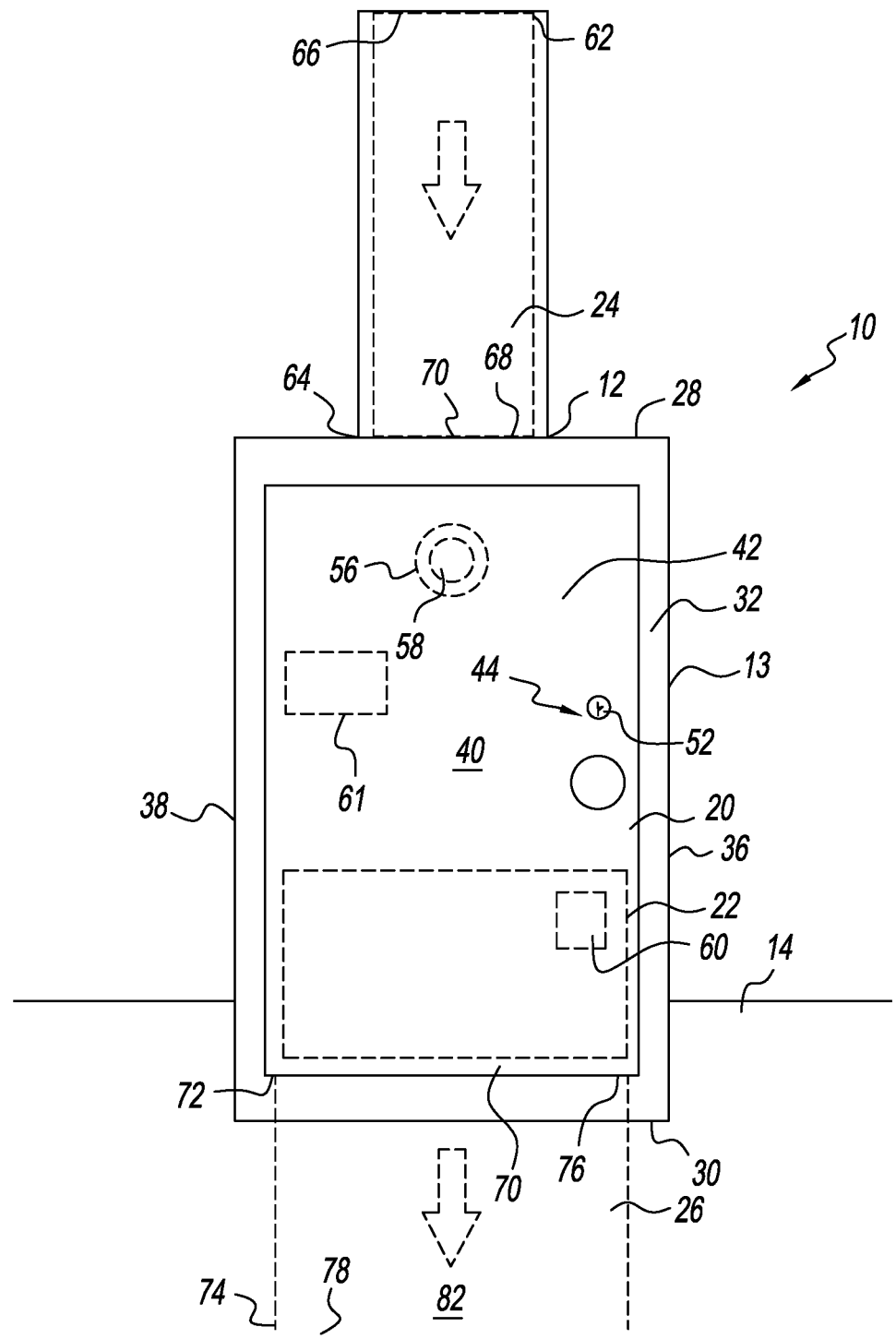
FIG. 2 is a front view of a package receptacle assembly.
Figure 3:
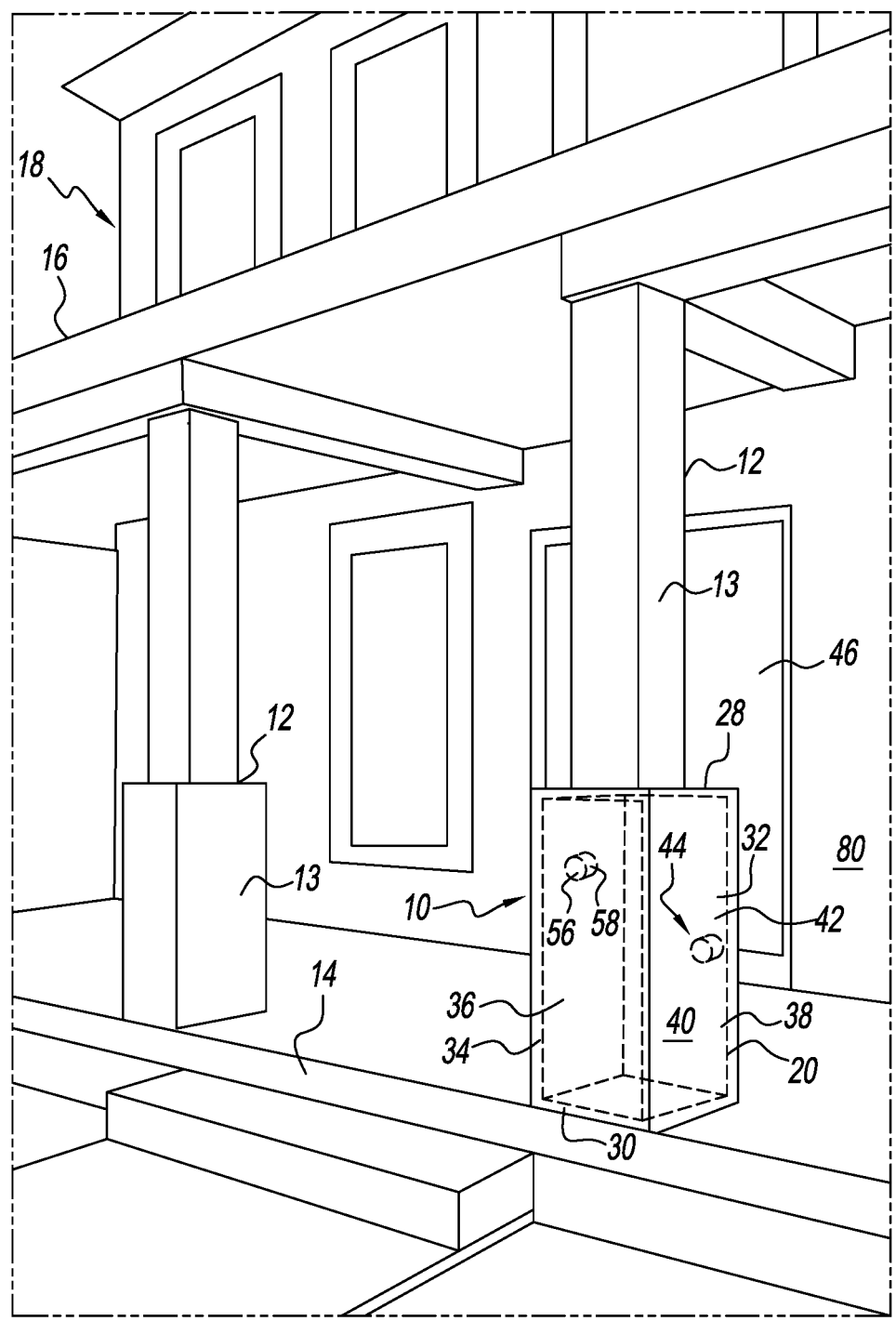
FIG. 3 is a perspective view of a package receptacle assembly.
Figure 4:
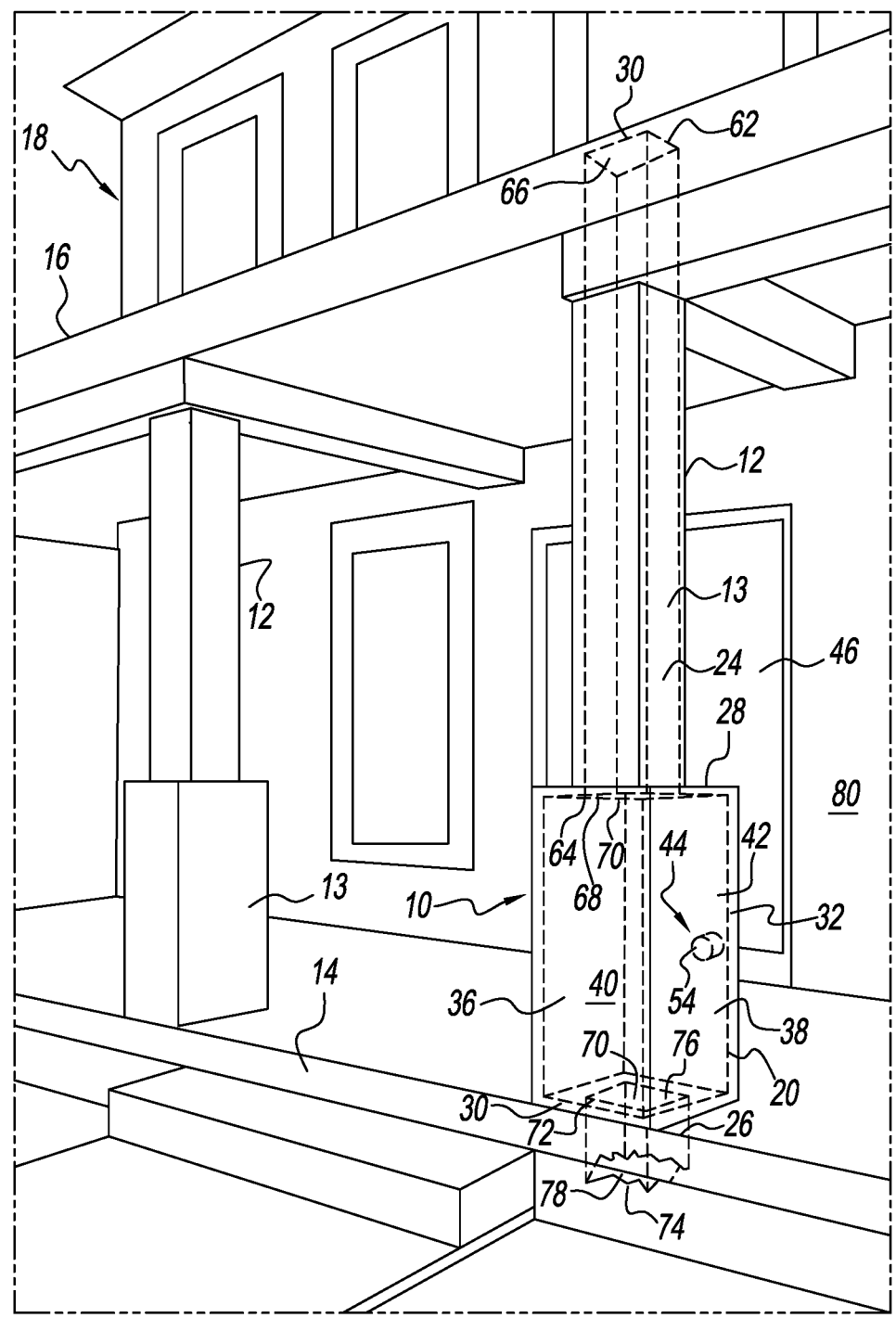
FIG. 4 is a perspective view of a package receptacle assembly.
Figure 5:
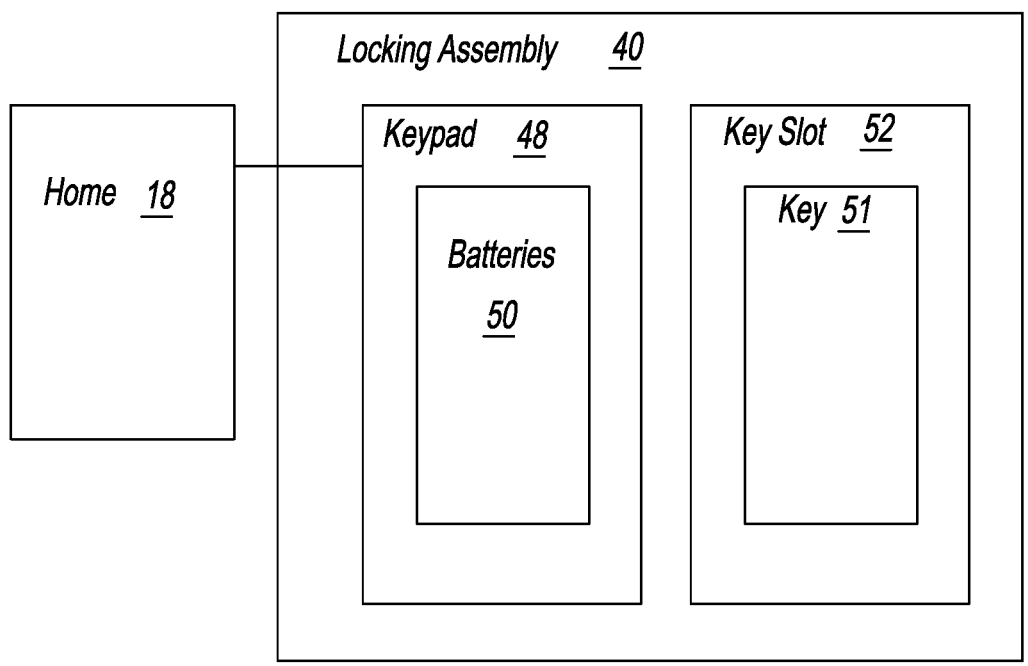
FIG. 5 is a schematic view of a package receptacle assembly.

With reference to the figures a package receptacle assembly 10 that is integrated in a column 12 extending between a ground surface, stoop, or porch 14 and a roof 16 of a home 18 is shown having a compartment 20 that is configured to have a sufficient size and shape to receive a package 22, which in some embodiments is in communication with a first chute 24, a second chute 26, or both the first chute 24 and the second chute 26. The term package 22 used herein excludes an envelope, flyer, or other deliverable thing that is known in the prior art to pass through the space allotted for a mail slot and instead refers to parcels and the like that are known in the prior art to be transported in a box or similar medium that encases an item that is not one or more pieces of paper, which are too large to be stored in a prior art conventional mailbox or mail slot.

Additionally, reference to integration of the compartment 20 into the column 12 indicates that the compartment 20 is positioned within the column 12 in such a way that an exterior 13 of the column 12 remains unchanged in aesthetic and design, except for alterations necessitated by the presence of a door 42 in some embodiments as described further herein. Through integration, the existence of the compartment 20 is hidden or obscured thereby further limiting the potential that a would-be thief would notice the presence of the compartment 20. Simultaneously, integration provides the benefit of maintaining the aesthetic of the column 12 and the home 18.

As seen in the illustrative embodiment, the compartment 20 has a rectangular cuboid shape having a top wall 28, a bottom wall 30 that opposes the top wall 28 in substantially parallel-spaced alignment, a front wall 32, a rear wall 34 that opposes the front wall 32 in substantially parallel-spaced alignment, and a first sidewall 36, a second sidewall 38 that opposes the first sidewall 36 in substantially parallel-spaced alignment. The front wall 32 and the rear wall 34 connect to the top wall 28, the bottom wall 30, the first sidewall 36, and the second sidewall 38 in substantially perpendicular alignment. Similarly, the first sidewall 36 and the second sidewall 38 connect to the top wall 28 and the bottom wall 30 in substantially perpendicular alignment. In this configuration, the top wall 28, bottom wall 30, front wall 32, rear wall 34, first sidewall 36, and second sidewall 38 form a cavity 40 therebetween and in some embodiments are configured to bear the load of remaining portion of the column 12, the roof 16, or both. In other embodiments of the present invention, the compartment 20 has a size and shape to receive a package 22 such as cuboid, prism, and trapezoidal.

Positioned on and through the front wall 32 is the door 42 that is interactively connected to a locking assembly 44 such that the locking assembly 44 is configured to selectively engage and secure the door 42 by preventing the door 42 from opening. As used herein, the front wall 32 refers to the wall of the compartment 20 that is closest to a front door 46 of the home 18 and therefore the door 42 of the compartment 20 is at least partially obscured when viewed at a distance away from the home 18 such as when the rear wall 34 is closest to a street 49 (not shown). In this location, the door 42 is readily available when the homeowner wishes to retrieve the package 22 while also limiting the exposure of the door 42 and any package from natural elements due to the coverage of the roof 16. In other embodiments, the door 42 is positioned on other locations of the compartment 20 but in such arrangements the level of security and convenience is at least partially diminished.

The locking assembly 44 in one embodiment is electronic and configured to be remote controlled over a wireless network by an individual or homeowner using an Internet connection. By allowing remote communication with the locking assembly, the homeowner can receive notifications transmitted from the package receptacle assembly 10 when the door 42 is opened or closed, or when the locking assembly 44 is engaged or disengaged.

Alternatively, or in addition, the locking assembly 44 in other embodiments has a digital keypad 48 that can store a secure passcode to permit entry through the door 42. The locking assembly 44 in some embodiments that are electronic are electrically connected to the home 18 so that the locking assembly 44 does not have a need for one or more batteries 50. Alternatively, in arrangements connected to the home 18, the locking assembly also has batteries 50 as a backup in case of a power outage. In other embodiments, the locking assembly 44 is solely mechanical and operates with a key 51 received in a key slot 52 or manual keypad 48.

In one embodiment, the locking assembly 44 has an internal switch 54 that is configured to be operated by an individual who is not the homeowner, such as a delivery driver or other courier. The internal switch 54 is housed within the cavity 40 of the compartment 20. The door 42 of the compartment 20 in such embodiments allows the door 42 to be opened when the internal switch 54 is not activated. When the package 22 is delivered, the courier activates the internal switch 54, which prevents the door 42 from being opened again after being closed thereby requiring the locking assembly 44 to be disengaged by the homeowner to obtain access to the cavity 40 of the compartment 20. In such configurations, the delivery of the package 22 is facilitated while maintaining a high level of security for the package 22 as the homeowner does not need to provide any other individual the capability to disengage the locking assembly. Other configurations of the locking assembly 44 include one or more of these various elements.

In some arrangements of the present invention, the rear wall 34 has a video assembly 56 having a camera 58, which is connected either directly or indirectly to a video storage unit 61 such as a hard drive or other recording device. In some embodiments, the video assembly 56 is configured to be remote controlled over a wireless network by an individual or homeowner using an Internet connection such that a livestream or recording of video content can be viewed by the homeowner remotely. In this way, the homeowner can view the contents of the compartment 20 in real time while also capturing the exact moment the package 22 is delivered thereby allowing the condition of the package 22 upon delivery to be recorded. Also, in some instances, physical characteristics of any thief or would-be thief can also be captured by the video assembly 56.

In instances where the video assembly 56 is connected to the Internet, notifications can be transmitted from the package receptacle assembly 10 upon detection of activity within the compartment 20. In one exemplary embodiment, the camera 58 is configured to capture information on a package label 60 such as a bar code or sender information, which can be recorded or transmitted. When the video assembly 56 is electronic, the video assembly 56 in some such embodiments is electrically connected to the home 18 so that the video assembly 56 does not have a need for one or more batteries 50.

When present, the first chute 24 extends from a second end 64 connected to the top wall 28 up through the column 12 to and through and connected to the roof 16 at a first end 62. The first chute 24 as shown in the exemplary embodiment, is enclosed except for a first opening 66 at the first end 62 and in the roof 16, and a second opening 68 at the second end 64 and the top wall 28 of the compartment 20. In this way, the package 22 can be delivered to and transported from the roof 16 through the first chute 24 and into the compartment 20 by gravity for retrieval through the door 42 of the compartment. This is particularly useful when a delivery is made by a drone or unmanned aerial vehicle (UAV), which can more readily land atop the roof 16 than navigating into the space between the roof 16 and the stoop 14.

In some embodiments, a flap or door 70 is positioned over the first opening 66, the second opening 68, or both to prevent rain, snow, and other natural elements from entering the first chute 24 and thereby the compartment 20, which may or may not contain the package 22. The flap 70 in some arrangements is selectively engageable, such that the flap 70 can be released either electronically—e.g., through a near-field communication (NFC) device like Bluetooth—or mechanically by the UAV or remotely by the homeowner.

In embodiments with a second chute 26, the second chute 26 extends from a first end 72 connected to the bottom wall 30 down through the stoop 14 and into the home 18 at a second end 74. The second chute 26 as shown in the exemplary embodiment, is enclosed except for a first opening 76 at the first end 72 and in the bottom wall 30 of the compartment 20, and a second opening 78 at the second end 74 positioned within, or to and through, an exterior wall 80 of the home 18. In this way, the package 22 can be delivered to and transported from the compartment 20 through the second chute 26 and into the home 18. This allows another level of securing the package 22 while preventing the compartment 20 from filling with too many packages 22.

In some arrangements, at least a portion of the second chute 26 is angled from the compartment 20 downwards towards a basement 82 of the home 18. This allows the package 22 to be placed within the home 18 while not obstructing the use of the front door 46 to the home 18.

In some embodiments, the flap 70 is positioned over the first opening 76, which in some arrangements is selectively engageable thereby allowing the flap 70 to be released either electronically—e.g., through a near-field communication (NFC) device like Bluetooth—or mechanically by the homeowner. This allows the homeowner to decide where they would prefer to collect the package 22 after delivery.

Due to the integration of the package receptacle assembly 10 into the column 12 of the home, multiple advantages are achieved. The package receptacle assembly 10 is obscured from view and is essentially hidden from recognition, preventing would-be thieves from knowing if and where packages 22 are stored. There is no need for a separate structure to be present in front of the home 18, which reduces costs and the curb appeal of the home 18 by maintaining the overall aesthetics of the home.

Therefore, a package receptacle assembly 10 has been provided that integrates into the exterior feature of a home; secures one or more packages from natural weather conditions and potential theft; maintains the aesthetic appeal of a home; is difficult to identify; secures packages inside a home; receives packages from unmanned aerial vehicles; and, improves upon the art.

From the above discussion and accompanying figures and claims it will be appreciated that the package receptacle assembly 10 offers many advantages over the prior art. It will be appreciated further by those skilled in the art that various other modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in light thereof will be suggested to persons skilled in the art and are to be included in the spirit and purview of this application.

What is claimed is:

1. A package receptacle assembly, comprising:
   an exterior porch column extending from a porch of a home to a roof of the home; and
   a compartment having a cavity positioned within the exterior porch column, wherein the compartment is configured to receive a package.

2. The package receptacle assembly of claim 1 wherein the compartment is integrated into the exterior porch column such that the compartment is substantially obscured from view.

3. The package receptacle assembly of claim 1 further comprising a first chute in communication with the compartment.

4. The package receptacle assembly of claim 3 wherein the first chute extends from the compartment up through the exterior porch column to the roof.

5. The package receptacle assembly of claim 4 further comprising a first end of the first chute abutting the roof having a first opening and a second end of the first chute abutting the compartment having a second opening, wherein the first chute is configured to receive the package through the first end of the first chute and transmit the package into the compartment through the first chute using gravity.

6. The package receptacle assembly of claim 5 further comprising the first end of the first chute having a flap.

7. The package receptacle assembly of claim 6 wherein the flap of the first chute is selectively engageable.

8. The package receptacle assembly of claim 4 further comprising a second chute in communication with the compartment.

9. The package receptacle assembly of claim 8 wherein the second chute extends from the compartment into the home.

10. The package receptacle assembly of claim 9 wherein at least a portion of the second chute is angled from the compartment downwards and towards a basement of the home.

11. The package receptacle assembly of claim 9 further comprising a first end of the second chute having a flap.

12. The package receptacle assembly of claim 11 wherein the flap of the second chute is selectively engageable.

13. The package receptacle assembly of claim 9 further comprising a first chute in communication with the compartment, wherein the first chute extends from the compartment up through the exterior porch column to the roof.

14. The package receptacle assembly of claim 1 further comprising a door positioned in a front wall of the compartment such that the door is positioned between a rear wall opposite the front wall and a front door of the home.

15. The package receptacle assembly of claim 1 further comprising a door having a locking assembly configured to selectively engage and secure the door.

16. The package receptacle assembly of claim 15 wherein the locking assembly is selected from the group consisting of a keypad, an internal switch housed within the compartment, and a remotely controlled locking assembly.

17. The package receptacle assembly of claim 16 wherein the locking assembly is configured to transmit a notification through a wireless network when the door of the compartment is opened and closed, and the locking assembly is engaged and disengaged.

18. The package receptacle assembly of claim 1 further comprising a video assembly positioned within the compartment.

19. A package receptacle assembly, comprising:
an exterior porch column extending from a porch of a home to a roof of the home;
a compartment integrated into the exterior porch column and having a cavity;
a door positioned in a front wall of the compartment such that the door is positioned between a rear wall opposite the front wall and a front door of the home;
a locking assembly configured to selectively engage and secure the door; and
a first chute in communication with the compartment, wherein the first chute extends from the compartment up through the exterior porch column to the roof.

20. The package receptacle assembly of claim 19 further comprising a second chute in communication with the compartment, wherein the second chute extends from the compartment into the home, and a video assembly positioned within the compartment.

\* \* \* \* \*